United States Patent

Raymond

[11] Patent Number: 5,184,643
[45] Date of Patent: Feb. 9, 1993

[54] VALVE SLEEVE ASSEMBLY

[76] Inventor: Robert E. Raymond, 495 Military Rd., Zanesville, Ohio 43701

[21] Appl. No.: 822,716

[22] Filed: Jan. 21, 1992

[51] Int. Cl.$^5$ .............................................. F16K 11/07
[52] U.S. Cl. ........................... 137/625.48; 137/625.66; 137/625.69
[58] Field of Search ....................... 137/625.48, 625.66, 137/625.69; 251/367

[56] References Cited

U.S. PATENT DOCUMENTS 3,354,912 11/1967 Gordon et al. ................. 137/625.69
3,590,874 7/1971 Rice ................................ 137/625.48
4,087,967 5/1978 Knapp ...................... 137/625.69 X Primary Examiner—John C. Fox
Attorney, Agent, or Firm—Francis T. Kremblas, Jr.

[57] ABSTRACT

A shrunk fit annular valve sleeve assembly characterized by a land configuration which provides a reduced annular area of engagement with the surrounding housing compared to the annular area of the base portion of the land disposed inwardly toward the spool bore to reduce the effects of temperature changes which cause spool bore deflection when using different metals for the housing and the sleeve. One preferred embodiment of a valve sleeve described defines a generally truncated triangular upraised land formed by complimentary shaped adjacent recesses when the sleeve is viewed in a section taken along a radial plane perpendicular to the axis of the spool bore.

6 Claims, 4 Drawing Sheets

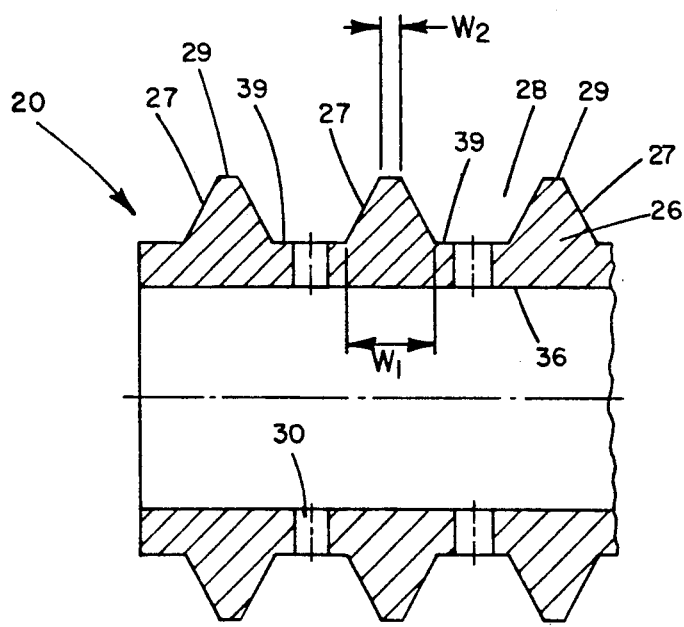
FIG. —5
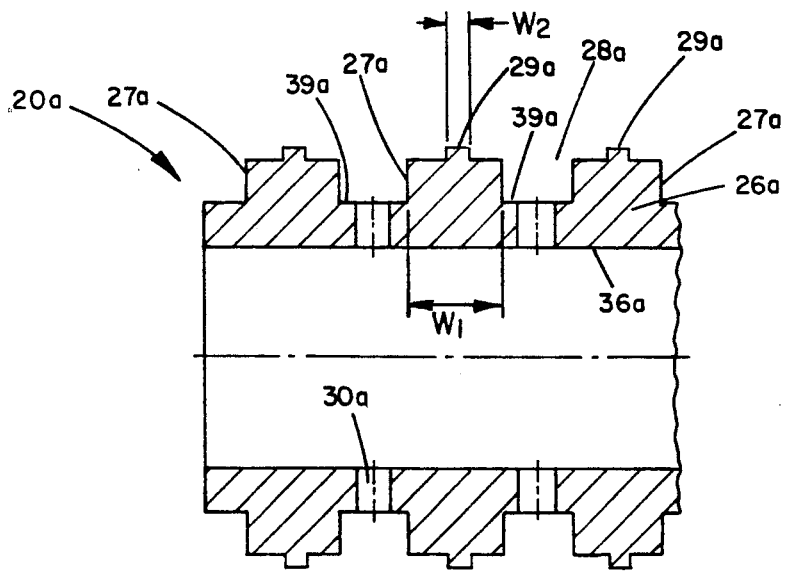
FIG. —6

VALVE SLEEVE ASSEMBLY

TECHNICAL FIELD

The present invention relates generally to shrunk annular sleeve assemblies and particularly to an improved annular valve sleeve having a honed bore and shrunk into a surrounding housing comprising a dissimilar metal and characterized by a configuration wherein the amount of deflection transferred from the outer periphery of the sleeve to the sleeve bore due to temperature changes is substantially reduced.

BACKGROUND ART

Shrink fitting of an annular sleeve in a corresponding outer housing opening is a very old and well-known art. It has been used in making a valve cartridge type housing having an annular sleeve provided with a precisely honed bore to slideably receive a valve spool, for example.

Instead of the very old practice of casting recesses in the annular bore opening in the housing. It was viewed easier to machine annular recesses in the outer surface of a sleeve which is then shrunk fit into an outer housing. The recesses accommodate fluid communication between the aligned radial ports in the sleeve and housing. This latter practice is considered reliable when the housing and the sleeve are made of the same metal or metals having nearly an identical co-efficient of expansion, such as cast iron and steel. It is considered unsatisfactory however, if dissimilar metals are used, such as aluminum and steel for example.

Even though aluminum is a preferred housing material because of economics and its resistance to corrosion, temperature changes encountered in many applications can result in deflection of the sleeve bore in magnitudes greater than the close fit tolerance between the sliding valve spool and the bore to cause the spool to become locked or frozen in the bore.

Therefore, in most applications, it has become a general practice to use the popular aluminum housing with a steel sleeve wherein the sleeve is concentrically stepped along its axial length and O-rings are used between valve passages and the annular recesses formed between the concentric steps in the sleeve and the annular opening in the housing. The sleeve is then held in its axial position by a mechanical shoulder and end plug arrangement.

It would be particularly advantageous to use a shrunk fit sleeve and housing of dissimilar metals to take advantage of the characteristics of aluminum as a housing material and a hard metal such as steel for the valve spool sleeve. However, the unreliability related to substantial deflections of the sleeve bore when subjected to significant temperature changes represents a problem which has not been satisfactorily solved by those skilled in the art and has discouraged use of such combinations in a shrunk fit configuration.

BRIEF DISCLOSURE OF INVENTION

The present invention relates generally to a novel sleeve constructions intended for shrink fitting applications wherein an annular sleeve is provided with a honed bore adapted to receive a slideably mounted valve spool in close fit relationship. More particularly, the invention is directed to such a combination wherein the sleeve and the outer housing surrounding the sleeve are of materials having dissimilar co-efficients of expansion of a magnitude which may cause deflections of the bore sufficient to interfere with the sliding fit of the spool or piston when subjected to temperature variations encountered during its intended use.

In accordance with the present invention, it has been discovered that appropriately altering the prior art rectangular configuration of the upraised portions or lands formed between recesses on the outer surface of the sleeve effectively and substantially reduce the deflection of the bore transferred through from the deflection occurring at the outer surface of the sleeve due to a greater degree of contraction of the outer housing compared to the sleeve.

This improved and novel configuration of the land portions of the sleeve deviates from the prior art by reducing the area in force transmitting engagement with the outer housing relative to the area of the base of the land defined along the bottom of the recess. By using a particular land configuration, a very large reduction of the deflection transferred to the sleeve bore can be achieved to prevent any significant distortion of the bore which would interfere with the slidable action of the spool over a larger temperature range compared to the practice of the prior art.

In the preferred embodiment disclosed herein, the land portion has a truncated triangular cross-sectional configuration when viewed radially along a plane parallel to the axis of the sleeve bore. The truncated portion of the triangular shape defines an outer generally planar surface area engaging the housing.

As another aspect of the present invention, particularly as applied to a spool valve construction, the truncated triangular configuration provides a larger annular recess between land portions to accommodate the flow of fluid through the port in the sleeve and the corresponding port in the housing tending to reduce the pressure drop through the recess compared to prior art land configurations.

As a further aspect of the present invention, configurations of the lands in accordance with the present invention provides sufficient resistance to axial movement of the sleeve in the housing and sufficient strength relative to the usual operating range of fluid pressure encountered in most fluid valving applications.

As another aspect of the present invention, the preferred configuration described herein is relatively simple to manufacture using standard tooling and machines.

BRIEF DESCRIPTION OF DRAWINGS

FIG. 5 is a partial side elevational view, in section, illustrating one-half of the land and recess configuration of the valve sleeve shown in FIG. 1, the section being taken along a radial plane parallel to the axis of the valve sleeve bore;

FIG. 6 is a partial side sectional view similar to FIGS. 5, however it illustrates one alternative embodiment of the present invention.

DETAILED DESCRIPTION

Figure 1:
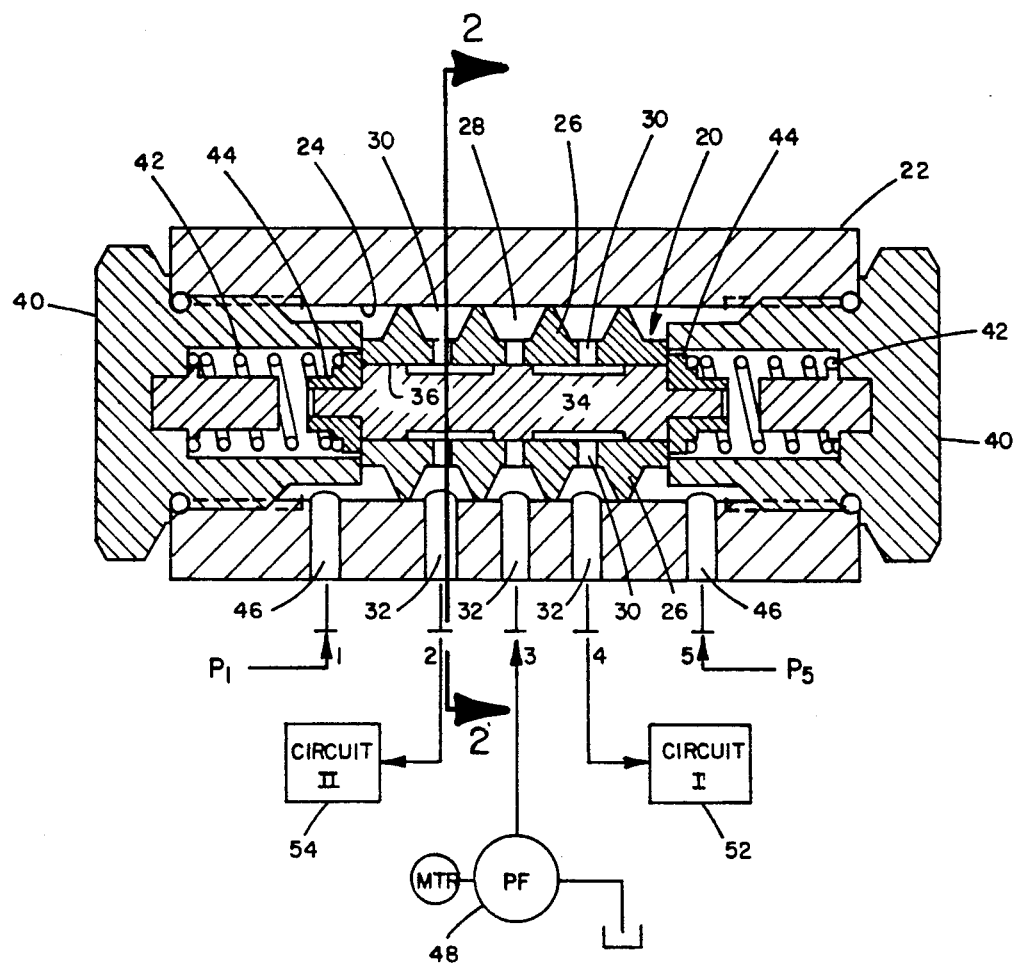
FIG. 1 is a side elevational view in section of a cartridge type valve spool using an outer housing and inner shrunk fit sleeve construction in accordance with the present invention, the section taken along the axis of the spool bore.
Figure 2:
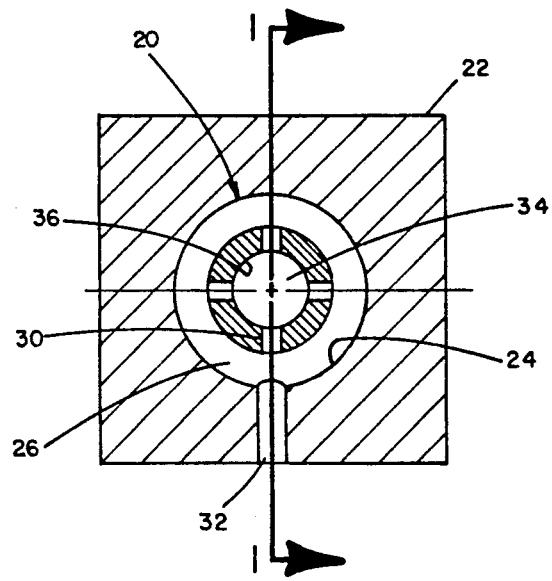
FIG. 2 is an end elevational view in section of the apparatus shown in FIG. 1; the section taken along line 2—2 in FIG. 1.

A shrunk fit annular valve sleeve, indicated generally at 20, in an outer housing, indicated generally at 22, constructed in accordance with the present invention is illustrated in FIGS. 1 and 2. In the example shown, outer housing 22 is merely a block of metal, preferably aluminum, provided with an annular bore or opening 24 having an internal diameter selected relative to a predetermined outer diameter of sleeve 20, preferably a hard metal, such as steel. The diameters are chosen in a well-known manner to assure the desired degree of a sealing interfering fit when the sleeve is heat shrunk into the opening 24 in a conventional manner well-known to those skilled in the art.

The outer periphery of the sleeve 20 is represented by the outer surface 29 of the upraised portions or lands 26 created by the annular recesses 28 machined into the outer surface 29. The recesses 28 form annular passages between the lands 26 to communicate fluid between radial ports such as 30 provided in sleeve 20 and housing ports 32 provided in housing 22.

The interfering shrunk fit between raised lands 26 and the inner walls of opening 24 effectively seal fluid communication from one annular recesses to another except as dictated by the position of a spool valve 34 slideably disposed between the ports 30 in provided along the axis of the spool bore 36 in a conventional manner.

As shown in FIG. 1 as a typical example, a pair of opposing, conventional end caps 40 are threadably inserted into each end of housing 22 and are adapted to seat springs 42 to bias spool 34 in a selected axial position within spool bore 36. A conventional spring seat 44 provides the engagement of the inner end of the bias springs with a respective end of spool 34 in a well-known manner.

Housing control ports 46 communicate fluid pressure signals to each end of spool 34 to initiate axial movement of the spool in a selected manner to control the flow of fluid from a pump 48 to any conventional fluid circuit elements diagrammatically illustrated at 52 and 54.

In the above general description, the operation and function of the valve sleeve 22 in housing 20 is conventional and well-known to those skilled in the art. However in the many applications which require a close tolerance fit between spool 34 within spool bore 36, the reliability of the operation of spool 34 depends upon maintaining the necessary clearance tolerance between the spool and the bore over potentially encountered temperature ranges which cause expansion and contraction of the metal parts.

This is not a particular problem when housing 20 and sleeve 22 are of the same or similar materials having essentially equal co-efficients of expansion. When different metals, such as an aluminum housing and a ferrous metal or ferrous alloy sleeve is used, the difference between the co-efficients of expansion can cause deflections of bore 36 of a magnitude larger than the initial honed clearance tolerance between the spool and spool bore when subjected to substantial temperature changes.

Figure 7:
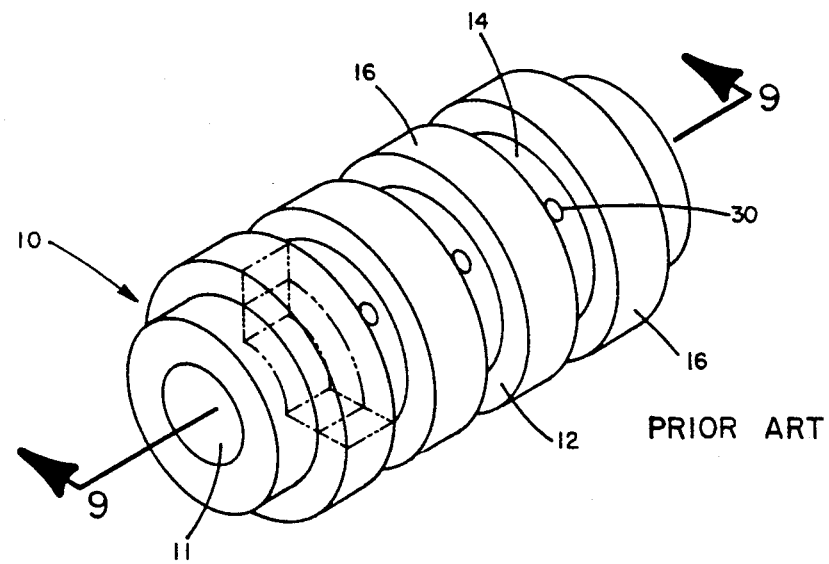
FIGS. 7, 8 and 9 are similar views to FIGS. 3, 4 and 5 respectively illustrating the prior art construction of the rectangular lands on a valve sleeve adapted to be shrunk fit within an outer housing.
Figure 8:
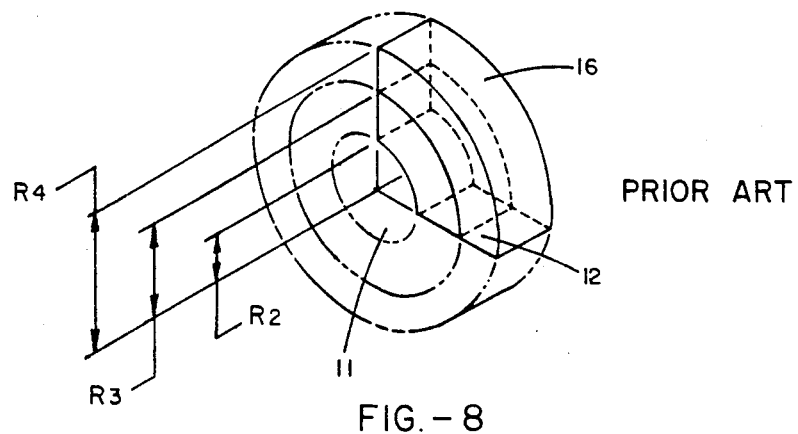
Figure 9:
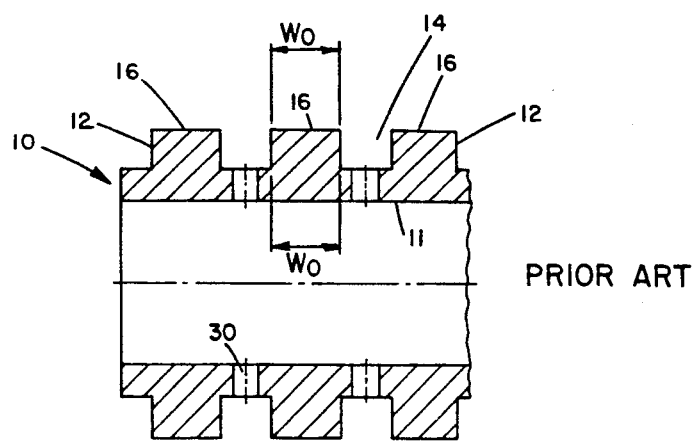

Referring to FIGS. 7-9, the conventional prior art sleeve configuration is shown wherein an annual sleeve 10 having a spool bore 11 is provided with rectangular recesses 14 between raised rectangular lands 12.

The rectangular recesses 12 and lands 14 are present to conventionally perform the communication and sealing function in a similar manner as the recesses 28 and lands 26 of the present invention shown in FIG. 1.

In making a shrunk fit sleeve assembly, the sleeve such as 10, as seen in FIGS. 7-9, is shrunk fit into an outer housing. Bore 11 is then honed to its final dimensions typically at ambient room temperatures. When used in operational applications, much higher or lower temperatures may be encountered. In the case wherein the outer housing is made of a preferred material, such as aluminum, and the sleeve 10 is steel, the magnitude of inward deflection of bore 11 for a 70 to 100 degree lowering of temperature from the ambient temperature, for example, can be equal to or greater than the clearance tolerance of the sliding fit of a spool in the bore. This would cause the spool to become locked or frozen in the bore, rendering the valve function inoperable.

With this rectangular prior art configuration of lands 12, inward deflections of the outer periphery of lands 12 caused by this difference in the coefficients of expansion of the dissimilar materials will be transferred equally to the bore because the stresses generated at the outer periphery increase approximately proportional to the ratio of the diameter of the outer boundary of the sleeve to the diameter of spool bore as the stress is distributed radially inward according to the classically recognized mathematical formula for concentric shrunk fit rings of equal width. That is, for example, an inward deflection of one ten thousandths of an inch over the annular outer surface area of lands 12 translates into an inward deflection of bore 11 approaching the same magnitude as the deflection of the outer surface area.

The potential for freezing of the spool in the sleeve bore upon significant temperature drops is the reason shrunk fit sleeves for such valve assemblies have not been favored if one wishes to use a different metal, such as aluminum for the housing with a steel sleeve. Given the practical advantages of such a combination of metals, the prior art has chosen to employ a stepped sleeve construction with O-ring seals to isolate ports and annular passages from one another rather than the shrunk fit construction which is viewed as unreliable over typically encountered temperature ranges.

However, in accordance with the present invention, it has been discovered that by appropriately changing the configuration of the prior art upraised lands, such as 12, to a configuration wherein the outer annular area of engagement of the land with the annular opening in the housing is significantly reduced compared to the projected underlying area of the base of the land, the amount of any deflection occurring at this outer engaging boundary transferred to the inner walls of the bore can be dramatically reduced.

In the preferred embodiment shown in FIGS. 1-5, the configuration of lands 26 in accordance with the present invention when viewed in a radial plane parallel to the axis of bore 36, is a truncated triangle having a base width $W_1$ defined by the intersection of side walls 27 with the bottom surface 39 of annular recesses 28. The width of outer surface 29 of each land 26 engaging the annular opening 24 of housing 22 is indicated as $W_2$. The annular or ring shaped area of engagement of the outer surface is a function of the width $W_2$ and the diameter of the outer circumference.

The annular surface area defined along a radially projected ring shaped section of each land 26 is a function of $W_1$ and the diameter of the ring shaped section.

Since the diameters of the annular sections referred to above is, for most practical purposes, selected to accommodate the necessary strength of the structure for the given application, the widths $W_1$ and $W_2$ can be adapted to obtain the beneficial results of substantially reducing the magnitude of deflections transferred to bore 36.

For example, under conventional practice employing steel valve sleeves, an outer boundary diameter to spool bore diameter in the range of about 1.8 to 1 to 2 to 1 is preferred. The above range will usually provide sufficient thickness to accept a reasonable depth of recesses 26 to provide an appropriate annual area or volume to communicate fluid between the spool and housing ports without an unacceptable pressure drop. Further, it accommodates sufficient thickness of metal between bore 36 and the bottom surface 29 of recesses 26 to provide a strong and sufficiently rigid structure accommodating the typical fluid pressures and shrink forces involved. However, other suitable ratio's can be used without departing from the spirit of the present invention.

Using a 2 to 1 ratio of the outer diameter of sleeve 20, to the diameter of bore 36, the preferred ratio of $W_1$ to $W_2$ is in the range of about 3 to 1 to 15 to 1. The most preferred range is about 5 to 1 to 10 to 1. These latter ranges provide a very significant reduction in the annular area between the periphery and the base of the land and result in a very dramatic reduction in deflection of bore 36 induced by deflections of the engaging outer housing.

It is believed that such area reducing configurations wherein the stress is transferred through the lands in an orderly manner from a lesser area to a greater area as the stress moves inwardly toward the bore are the most effective for reducing the deflection occurring at the bore. A preferred configuration is the truncated triangular shape shown in FIGS. 1–5 wherein the reduction in deflection transferred to the bore is proportional to the ratio of the widths $W_1$ and $W_2$. Alternatively, the configuration shown in FIGS. 6 also provides similar beneficial results.

Therefore, in accordance with the present invention, reducing the area of engagement of the outer annular surface of land 26 relative to the inwardly projected annular area at the base of the land permits one to employ two different metals in the assembly of housing 22 and sleeve 20 to prevent deflections of spool bore 36 sufficient to interfere with the operability of spool 34 over a very significantly wider range of temperatures compared to the prior art shrunk sleeve construction.

Figure 4:
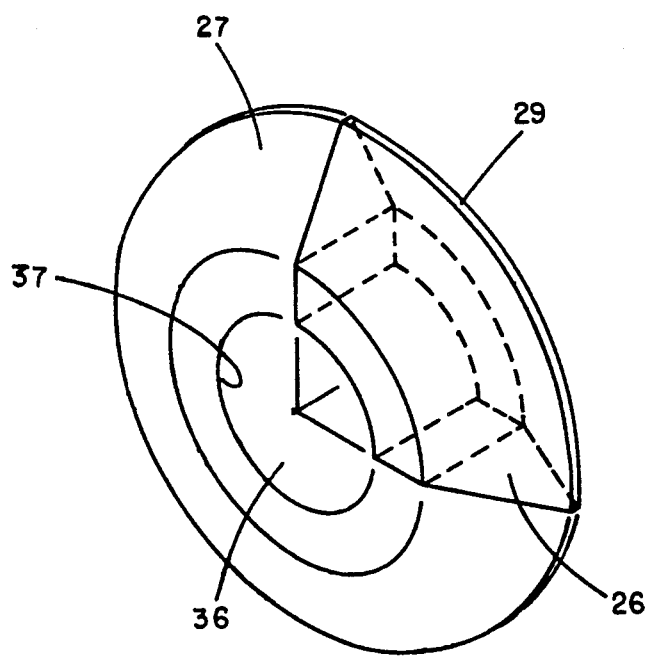
FIG. 4 is a perspective view illustrating one land area apart from the remaining portion of the valve sleeve shown in FIG. 3.

For purposes of illustration, this concept is diagrammatically illustrated in FIG. 4 wherein an arcuate segment of a ring or donut shaped portion representing a single land 26 of sleeve 20 is shown. The remaining ring shape shown in ghost lines represents one land portion removed along a pair of planes perpendicular to the axis of bore 36 at the junction of the sides 27 and the bottom of adjacent recesses 39. The dotted lines represent the annular areas along an arc segment of the base of the land, and at the inwardly projected area of the wall bore 36.

In this diagrammatic example as shown in FIG. 5, the width of outer surface 29 is $W_2$. The width $W_1$ is projected radially inward to the width of the annular segment of the base of land 26 defined at the intersection of the side walls 27 with the bottom surface 39 of recess 28.

FIGS. 4 and 5 illustrate that the annular area of the outer boundary of the ring relative to the area of the boundary of ring section along the base of land 26 can be adjusted by changing the ratio of $W_1$ and $W_2$ for any given ratio between the diameter of the ring portions involved. The appropriate reduction of $W_2$ relative to $W_1$ effectively reduces the area of engagement of the spool with the housing relative to the annular area of the inwardly projected ring shaped area along the base of the land. The reduction of area is reflected in the ratio of the diameters defined above and the ratio of $W_2$ to $W_1$.

Figure 3:
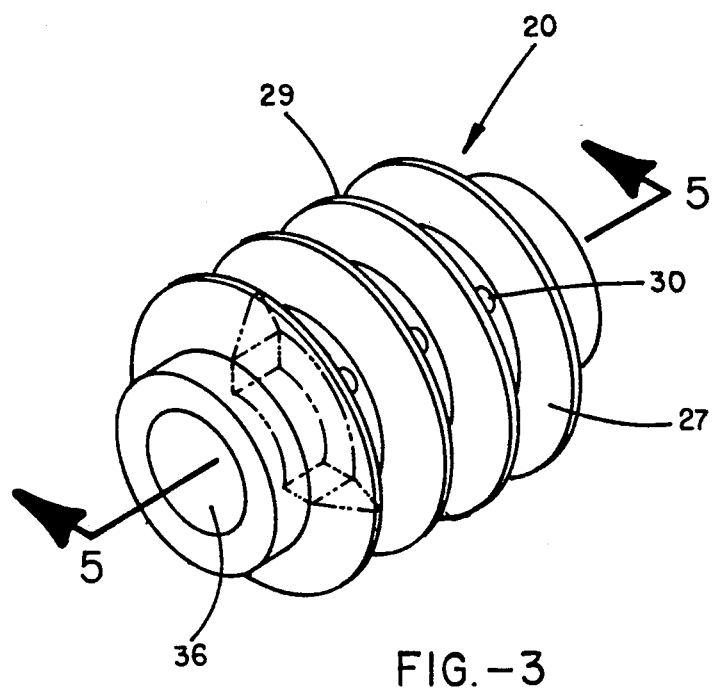
FIG. 3 is a perspective view of the valve sleeve forming a part of the apparatus shown in FIG. 1.

As seen in FIGS. 3–5 a dramatic reduction of the area of the outer engaging surface of land 26 constructed in accordance with the present invention is obtained as compared to the rectangular land configuration of the prior art as shown in FIGS. 6–8.

An arcuate segment of the respective configurations are diagrammatically shown for illustration purposes. It should be understood that the principle is valid as applied over the whole of each of the annular areas involved.

Specifically referring to FIGS. 7–9, the annular area of engagement of the prior art rectangular land configuration is a function of the product of the width, $W_0$ and the radius of the arcuate segment, $R_4$, measured from the axis of the spool bore 11. Of course the whole annular area involved would be calculated by using the respective diameter of the ring shaped segments referred to in the example as described in relation to FIG. 4. Comparing this annular area to the projected arcuate segment represented at the base of land 12 where the upraised land 12 joins the bottom surface of recess 14, the width dimension is unchanged, however, the radius $R_3$, is smaller by a magnitude representing the thickness of the sleeve between the walls of bore 11 and the bottom surface of recesses 14. Therefore one can readily appreciate that the arcuate area of the inwardly disposed segment having a radius $R_3$ is less than the outer segment having a radius $R_4$. In the same manner, the arcuate segment having a radius $R_2$ has an area less than the outer segment.

According to the classical formula for calculating deflection of the bore of such a ring shape, inward pressure applied to the outer boundary in such a configuration induces hoop stress distribution such that the diametrical deflection through to the bore is essentially a 1 to 1 ratio. Assuming a typical 2 to 1 ratio of the diameter of the outer boundary surface 16 to the diameter of the bore and the typical wall thickness between the bore and the bottom of the recesses, an inward diametrical deflection of the larger area of the outer boundary of land 12 of 0.0002 inches, for example, will result in a diametrical deflection of nearly the same magnitude over the smaller projected area of the segment having a radius of $R_3$. The diametrical deflection transferred to the bore, represented by the segment having a radius $R_2$, at least approaches a similar 1 to 1 ratio. At best the bore defection is about 70 percent of the same magnitude of 0.0002 inches.

A comparison can be made for the land configurations according to the present invention as shown in FIGS. 3–5, having the same ratio 2 to 1 of outer diameter to bore diameter and typical wall thickness referred to above wherein the dimension $W_1$ equals $W_0$, and $W_2$ is 8 times smaller than $W_1$. The same 0.0002 inch magnitude deflection at the outer surface results in a deflection of the bore of at least about 0.000025. This reduction is at least about 8 times less than the deflection resulting in the prior art configuration referred to above.

A practical lower limit of the width $W_2$ is imposed by the modulus of elasticity of the metals employed since it would be detrimental to permit the land 26 to actually penetrate into the housing metal by forces sufficient to permanently deform the housing metal and effectively destroy the shrink fit. The sealing function between the lands 26 and the housing is important in valve operation and leaks may occur upon subsequent expansion after such permanent deformation of the housing by the lands.

With reference to FIG. 6, another embodiment of a valve sleeve construction is shown which differs only in the configuration of the lands, however, the outer surface area is still reduced compared to the inner area approaching the bore. In this embodiment, the complimentary portions of the sleeve 20a carry the same reference numerals followed by the letter "a" as the embodiment shown in FIGS. 1-5.

As seen in FIG. 6, the outer engaging surface 29a area of land 26a is in the form of a small rectangle joining a larger rectangular base. The width of the outer engaging surface 29a, $W_2$, is smaller than the width, $W_1$, of the base at the junction with the bottom surface 39a of recesses 28a. Therefore a similar advantage is obtained employing this alternative land configuration compared to that shown in FIG. 5 as a similar area reduction along the surfaces engaging the outer housing compared to the area along the base of the land 26a is created. The same type of reduction of hoop stress distribution therefore occurs as related above herein in accordance with the present invention.

One skilled in the art will readily appreciate the desirability of the configuration of the lands 26 as seen in FIGS. 1-5 as relatively easier to manufacture in a single cutting operation compared to the alternative configurations which provide a similar relative area reduction between the engaging surface 29 and the base of the land. An additional advantage of the triangular cross-sections shape shown in FIGS. 1-5 is a significant increase in area of the recesses 28 compared to the rectangular configuration for the same thickness of the width of the bottom of the recesses B9. Such a configuration provides a very adequate metal to metal seal and the necessary strength when properly designed for a given application. The relative increase in the area of the recess offers the desirable result of reducing the pressure drop of fluid flow through the recess with no substantial lessening of the necessary sealing ability or required strength of the sleeve.

A test was made comparing the rectangular land configuration of the prior art, such as shown in FIGS. 7-9, with the truncated triangular land configuration according to the present invention. The only dimension different between these shrunk-fit valve sleeve constructions tested related to the width of engaging surface 29 of the land 26 of sleeve 20 of the present invention. This width, $W_2$, as seen in FIG. 5 was about one-eighth of $W_1$ and $W_1$ was equal to $W_0$ as shown in the prior art configuration of FIGS. 9.

Precision ground valve spools having the same clearance fit of 0.0001 within the similarly ground bores of each assembly were used in each of the tested sleeve constructions. Both constructions were equally subjected to progressively lower temperatures. During the test, the spools were slideably manipulated within the bores at predetermined temperature levels. At 0 degrees F., the prior art sleeve became immovable or frozen in the bore. However, the sleeve having the tapered or triangular cross-sectional configuration of lands according to the present invention was still freely movable at minus 60 degrees F.

This test indicates a very dramatic increase in the reliability of the valve sleeve assembly of the present invention over the prior art configuration over a significantly greater temperature range. It is believed that the spool would continue to function properly at lower temperatures, however obtaining lower temperatures than minus 60 degrees F. was limited by the testing conditions.

It should also be noted that the preferred cross-sectional configuration for land 26, such as shown in FIGS. 5, is or closely approaches an isosceles triangle wherein the projected angle between a side 27 and a vertical line perpendicular to the axis of the bore is preferably between about 17 to 33 degrees, However, other configurations which suitably provide an orderly stress distribution inwardly toward the base of the land and a suitable reduction of the annular surface area of engagement with the housing relative to the projected annular surface area along the base of the land are within the spirit of the present invention.

Other alternative construction of lands 26a may include an arcuate or dome shaped configuration, not shown. It is believed that such alternative configurations which provide a smaller annular area of engagement with the housing relative to the annular area of the base of the land would provide a significant reduction in the amount of diametrical deflection of the spool bore due to forces causing deflection of the outer periphery of the sleeve. The economics of manufacturing such alternate shapes tend to dictate using the preferred configurations disclosed herein.

While not wishing to be bound to any particular theory, it is believed that the stress applied by the outer housing in such shrunk fit assembles to the smaller engaging surface of a land having a configuration according to the present invention tends to be distributed in a generally conical manner through the inwardly progressively larger area and volume of the adjoining mass of the land. However, in the prior art configuration the stress tends to be confined by the rectangular shape having a constant width from the area of engagement with the housing toward the base of the land and proportionally increases as it is transferred inwardly from a larger area into a smaller area as it approaches the bore.

This tends to explain why the configurations according to the present invention, which provide an progressively larger area in an inward direction for distribution of the stress forces applied to the smaller outer area of contact with the housing, result in a diminution of the magnitude of the bore deflection compared to the prior art configuration.

However, it should be noted that the depth of the recess 28 which normally defines the height of the land in accordance with the present invention, must be of sufficient magnitude to provide an orderly distribution of the stress pattern encountered as well as sufficient area to accommodate the flow of fluid between the sleeve and housing ports without introducing a disruptive or undesirable pressure drop. Using the typical range of bore diameter to the outer diameter of the sleeve, which is well-known to those skilled in the art, the conventional depth for the recesses and the practical wall thickness between the walls of the bore and the bottom of the recesses, will adequately provide a sufficient height dimension of a land constructed in accordance with the present invention to obtain beneficial results. Given these factors, the deflection of the bore due to deflections of the outer periphery of the lands can be reduced by the ratio of the widths $W_2$ over $W_1$ according to the teachings of the present invention to permit the advantageous use of, for example, aluminum housings with shrunk fit steel valve sleeves for reliable operation over a significantly wider range of temperatures compared to the prior art. Given this reliability of such shrunk fit sleeve assemblies over the stepped sleeve and O-ring assembly presently used, the advantages will be quickly appreciated by those skilled in the art.

I claim:

1. An improved spool valve assembly of the type having an outer housing of a first metal material and a cylindrical sleeve of a second different metal material shrunk fit within an annular opening in said housing and provided with a cylindrical bore adapted to closely fit with a spool valve element slideably mounted in said bore, said assembly including selected valve ports radially extending into said housing and said sleeve for communication of the flow of fluid through said ports dependent upon the axial position of said valve element in said bore, the improvement comprising a plurality of annular recesses formed on the outer surface of said sleeve aligned to annularly communicate fluid between certain of said ports in said sleeve with certain of said outer ports in said housing, said recesses forming radially extending annular lands spaced from one another; each of said lands having a cross-sectional configuration when viewed along a radial plane parallel to the axis of said cylindrical bore defining vertically extending side walls extending between a bottom surface of an adjacently disposed recess which defines a width of the base portion of said land and an outer surface portion engaging said housing, the ratio of the width of said base portion to the width of said outer surface portion engaging said housing being at least 2 to 1.

2. The assembly defined in claim 1 wherein the ratio of the width of said base portion to the width of said outer surface portion of a respective one of said lands ranges from about 3 to 1 to 15 to 1.

3. The assembly defined in claim 1 wherein said cross-sectional configuration of said lands is generally a truncated triangular shape.

4. The assembly defined in claim 3 wherein said triangular configuration closely approximates a truncated isosceles triangle.

5. An annular sleeve provided with a central bore conformed to be shrunk fit within an annular opening of an outer housing member, said annular sleeve being a material having a different co-efficient of expansion relative to the material forming said outer housing and including an annular bore, a plurality of annular recesses formed on the outer surface of said sleeve in spaced relationship from one another generally parallel to the axis of said annular bore, the space between said recesses defining an annular upraised land, each of said lands having an annular outer surface area, an annular base surface area and side walls defining the width of said annular outer surface area and said annular base surface area, said annular outer surface area conformed to engage the inner wall portions of a cylindrical opening provided in said outer housing in a shrink-fit relationship; said annular outer surface area of a respective land engaging said housing being no greater than approximately one-half of its annular base surface area taken along a line where the side walls join a bottom surface of adjacent recesses.

6. An improved outer housing and shrunk sleeve assembly comprising;

a) an outer housing provided with an annular opening;

b) an annular sleeve shrunk fit within said annular opening and comprising a material having a different co-efficient of expansion relative to said housing, said sleeve including a cylindrical bore conformed to receive a slideably mounted cylindrical member in a close tolerance fit and an outer surface provided with a plurality of annular recesses axially spaced from one another and forming adjacent upraised lands disposed in a shrunk fit, force transmitting engagement with inner wall portions of said annular opening in said housing; the cross sectional configuration of each of said lands when viewed in a radial plane parallel to the axis of said cylindrical bore defining an outer planar surface engaging said housing, tapered side walls extending toward said cylindrical bore from said outer surface, each of said side walls terminating at the bottom surface of an adjacently disposed recess and a base defined between the junction of said bottom surfaces of said recesses and said side walls, the width of said outer surface engaging said housing being less than one-half the width of said base.

* * * * *